United States Patent
Seko et al.

(10) Patent No.: US 11,900,714 B2
(45) Date of Patent: Feb. 13, 2024

(54) SEARCH INFORMATION PROVIDING DEVICE, SEARCH INFORMATION PROVIDING SYSTEM, SEARCH INFORMATION PROVIDING METHOD, AND PROGRAM RECORDING MEDIUM

(71) Applicant: NEC Corporation, Tokyo (JP)

(72) Inventors: Kazuki Seko, Tokyo (JP); Takeshi Kojima, Tokyo (JP); Makoto Kataoka, Tokyo (JP); Toshiro Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/802,391

(22) PCT Filed: Mar. 19, 2020

(86) PCT No.: PCT/JP2020/012441
§ 371 (c)(1),
(2) Date: Aug. 25, 2022

(87) PCT Pub. No.: WO2021/186712
PCT Pub. Date: Sep. 23, 2021

(65) Prior Publication Data
US 2023/0106798 A1    Apr. 6, 2023

(51) Int. Cl.
*G06V 40/13* (2022.01)
*G06V 20/52* (2022.01)

(52) U.S. Cl.
CPC .......... *G06V 40/1318* (2022.01); *G06V 20/52* (2022.01)

(58) Field of Classification Search
None
See application file for complete search history.

(56) References Cited

U.S. PATENT DOCUMENTS

2013/0216106 A1   8/2013  Hara et al.
2018/0074466 A1*  3/2018  Witczak ................. G05B 15/02

FOREIGN PATENT DOCUMENTS

| JP | H10-275211 A | 10/1998 |
| JP | 2003-184381 A | 7/2003 |
| JP | 2005-128634 A | 5/2005 |
| WO | 2009/090724 A1 | 7/2009 |
| WO | 2012/063708 A1 | 5/2012 |

OTHER PUBLICATIONS

Yoneyama Tokuji, Machine Translation of JP2005128634, 2005 (Year: 2005).*
International Search Report for PCT Application No. PCT/JP2020/012441, dated May 19, 2020.
English translation of Written opinion for PCT Application No. PCT/JP2020/012441, dated May 19, 2020.

* cited by examiner

Primary Examiner — Joseph R Haley (57) ABSTRACT

In order to provide a technique capable of presenting information that is different from the image of a surveillance camera and is effective for searching for a person, this search information providing device includes, as functional units, a collation unit and an output unit. The collation unit collates a fingerprint image obtained by a fingerprint photographing device with a fingerprint image, of a search target person, given in advance. When the fingerprint image on the handrail member matches the fingerprint image of the search target person, the output unit outputs information indicating that the search target person has been detected to a predetermined reporting destination.

5 Claims, 6 Drawing Sheets

SEARCH INFORMATION PROVIDING DEVICE, SEARCH INFORMATION PROVIDING SYSTEM, SEARCH INFORMATION PROVIDING METHOD, AND PROGRAM RECORDING MEDIUM

This application is a National Stage Entry of PCT/JP2020/012441 filed on Mar. 19, 2020, the contents of all of which are incorporated herein by reference, in their entirety.

TECHNICAL FIELD

The present invention relates to a technique for providing information effective for searching for a person.

BACKGROUND ART

There is a case where an image of a surveillance camera is used when a person is searched for. PTL 1 discloses a technique for detecting a wanted person using face data of persons captured by a camera that captures the inside of a car of an elevator or a door of the car on floors where the car stops.

PTL 2 discloses a technique for reading living body information of an entering person by a living body information sensor installed on a circulation type carrying device carrying the entering person, and controlling opening and closing of a gate provided at an entrance of a building or the like using by the read living body information.

CITATION LIST

Patent Literature

[PTL 1] WO 2009/090724
[PTL 2] JP 2003-184381 A

SUMMARY OF INVENTION

Technical Problem

When searching for a person, it is conceivable to use not only a camera that captures the inside of a car of an elevator or a door of the car as described in PTL 1 but also an image captured by surveillance cameras installed in town, a surveillance camera installed in a station, or the like.

However, even if the search target person passes through a capturing range of the surveillance camera, if the area where he/she passed is a blind spot of the surveillance camera such as an area behind a pillar, there is a problem that the search target person does not appear in the image of the surveillance camera.

A main object of the present invention is to provide a technique capable of presenting information that is different from the image of a surveillance camera and is effective for searching for a person.

Solution to Problem

In order to achieve the above object, a search information providing device according to the present invention includes, as its one form:
a collation unit that collates an image of a fingerprint of a person in a captured image of a fingerprint mark of the person left on a handrail member that circulates in a circulation path passing through an outward part that assists the person while moving along with movement of a conveyance member that conveys the person by moving from an entrance toward an exit and a return part that moves in a direction from the exit toward the entrance with an image of a fingerprint of a search target person that is given in advance; and an output unit that, when the image of the fingerprint of the person on the handrail member matches the image of the fingerprint of the search target person, outputs, to a predetermined reporting destination, information indicating that the search target person has been detected.

A search information providing system according to the present invention includes, as its one form:
the search information providing device as described above; and
a fingerprint capturing device that captures a fingerprint mark of the person left on the handrail member at the return part of the circulation path and supplies an image of a fingerprint of the person to the search information providing device.

A search information providing method according to the present invention includes, as its one form:
collating an image of a fingerprint of a person in a captured image of a fingerprint mark of the person left on a handrail member that circulates in a circulation path passing through an outward part that assists the person while moving along with movement of a conveyance member that conveys the person by moving from an entrance toward an exit and a return part that moves in a direction from the exit toward the entrance with an image of a fingerprint of a search target person that is given in advance; and when the image of the fingerprint of the person on the handrail member matches the image of the fingerprint of the search target person, outputting, to a reporting destination designated in advance, information indicating that the search target person has been detected.

A program recording medium according to the present invention stores, as its one form,
a computer program that causes a computer to execute
collating an image of a fingerprint of a person in a captured image of a fingerprint mark of the person left on a handrail member that circulates in a circulation path passing through an outward part that assists the person while moving along with movement of a conveyance member that conveys the person by moving from an entrance toward an exit and a return part that moves in a direction from the exit toward the entrance with an image of a fingerprint of a search target person that is given in advance, and
when the image of the fingerprint of the person on the handrail member matches the image of the fingerprint of the search target person, outputting, to a reporting destination designated in advance, information indicating that the search target person has been detected.

Advantageous Effects of Invention

According to the present invention, it is possible to provide a technique capable of presenting information that is different from the image of a surveillance camera and is effective for searching for a person.

EXAMPLE EMBODIMENT

Example embodiments according to the present invention will be described below with reference to the drawings.

First Example Embodiment

Figure 1:
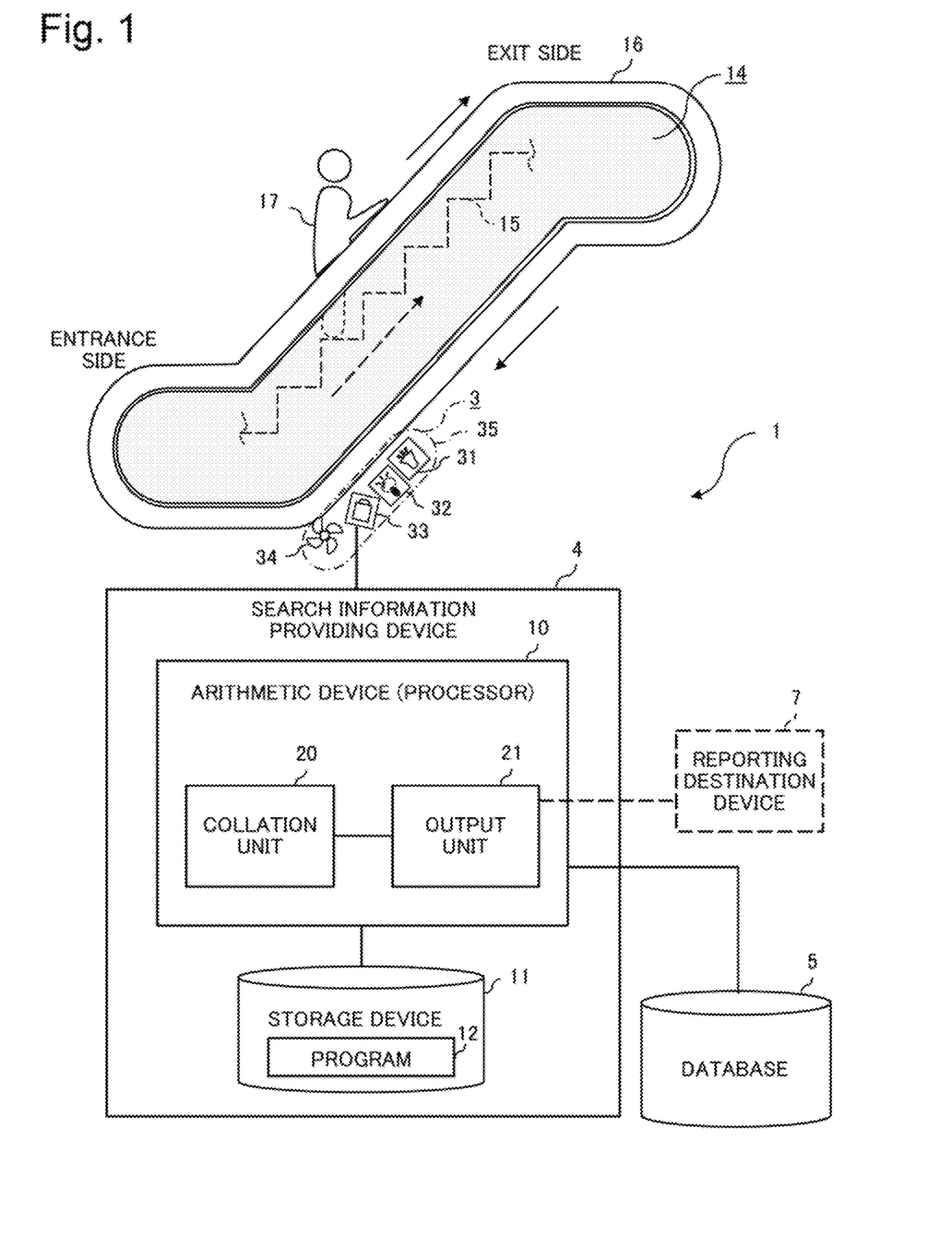
FIG. 1 is a view indicating a configuration of a search information providing system and a search information providing device of a first example embodiment according to the present invention.

FIG. 1 is a view indicating the configuration of the search information providing system of the first example embodiment according to the present invention. A search information providing system 1 of the first example embodiment is a system that, using a fingerprint mark of a person left on a handrail member 16 of an escalator 14, provides information effective for searching for a search target person. The escalator 14 includes a conveyance member 15 and the handrail member 16. The conveyance member 15 include a configuration capable of conveying a person 17 who is a conveyance target on the conveyance member 15 from an entrance side to an exit side by moving in a direction from the entrance where the person 17 gets on toward the exit. The handrail member 16 is a member that assists the person 17 on the conveyance member 15 while moving along with movement of the conveyance member 15. The handrail member 16 circulates in a circulation path that passes through the outward part moving in the direction from the entrance toward the exit and the return part moving in the direction from the exit toward the entrance. In FIG. 1, the escalator 14 conveys a person in an ascending direction, but the escalator 14 may convey a person in a descending direction. When conveying the person in the descending direction, the moving direction (circulating direction) of the handrail member 16 becomes opposite to that in FIG. 1.

The search information providing system 1 of the first example embodiment includes a fingerprint acquiring device 3, a search information providing device 4, and a database 5. The fingerprint acquiring device 3 includes a configuration of capturing a fingerprint mark of a person left on the handrail member 16 and outputs a captured image of the fingerprint of the person. The configuration of the fingerprint acquiring device 3 is not limited as long as it can capture a fingerprint mark of a person left on the handrail member 16 and output a captured image of the fingerprint of the person, but an example of the fingerprint acquiring device 3 will be described below. For example, the fingerprint acquiring device 3 includes an adhesion device 31, an irradiation device 32, a fingerprint capturing device 33, and a removal device 34.

The fingerprint capturing device 33 is, for example, a video camera that captures a moving image. The fingerprint capturing device 33 is installed at a position facing the handrail member 16 passing through the return part from the exit toward the entrance in the circulation path of the handrail member 16 and enabling to capture a fingerprint mark of a person left on the surface of the handrail member 16. That is, it is assumed that a fingerprint mark of the person 17 is left on the surface of the handrail member 16 by being gripped by the person 17 on the conveyance member 15 when the handrail member 16 passes through the outward part from the entrance toward the exit of the escalator 14. The part of the handrail member 16 from which the person 17 having reached the exit of the escalator 14 releases his/her hand by getting off the conveyance member 15 (that is, a part with a fingerprint mark) changes the orientation of the movement to a direction from the exit toward the entrance. Then, the part of this handrail member 16 moves inside a cover member (not illustrated) that covers a site of the handrail member 16 passing through the return part, for example. Thus, due to the cover member covering the site of the handrail member 16 passing through the return part, a new fingerprint of a person is avoided from being left on the handrail member 16 at the return part.

The fingerprint capturing device 33 captures, at the return part of the handrail member 16, the fingerprint mark left by the person 17 gripping the handrail member 16 when the handrail member 16 passes through the outward part. The part of the handrail member 16 captured by the fingerprint capturing device 33 is irradiated with light emitted from the irradiation device 32. The fingerprint capturing device 33 is a capturing device capable of capturing light having a wavelength of light emitted from the irradiation device 32.

The fingerprint capturing device 33 is connected to the search information providing device 4 and outputs a captured image to the search information providing device 4. The fingerprint capturing device 33 includes a function of associating, for example, time information indicating a captured time and information indicating a place of capturing with a captured image to be output to the search information providing device 4. Examples of information indicating the place of capturing include information for identifying the fingerprint capturing device 33 having captured and information indicating the installation place of the escalator 14 (handrail member 16) having been captured.

The handrail member 16 often includes a belt-shaped upper surface part and a side surface part of its both sides. It is assumed that a finger of a hand gripping the handrail member 16 often presses the side surface part of the handrail member 16. Thus, the fingerprint capturing device 33 captures at least one side surface part of such the handrail member 16 (the side surface part on the right side when facing the moving direction of the handrail member 16 in a case where it is assumed to be gripped with the right hand, and the side surface part on the right-left opposite sides in a case of being gripped with the left hand). Furthermore, for example, by providing a plurality of the fingerprint capturing devices 33, the fingerprint acquiring device 3 may be provided with a configuration capable of acquiring captured images of the upper surface part and the side surface parts on both sides of the handrail member 16

Furthermore, the capturing range of the fingerprint capturing device 33 is set to a size based on a standard size of the human hand, for example. Such a capturing range suppresses fingerprints of a plurality of persons from being captured in a captured image captured by the fingerprint capturing device 33.

The adhesion device 31 includes a configuration in which a luminescent agent for causing a fingerprint mark of the person left on the handrail member 16 to become luminescent adheres to the handrail member 16 at a part nearer than a circulation path part captured by the fingerprint capturing device 33 in such a way that the fingerprint capturing device 33 clearly captures the fingerprint mark of the person. As the luminescent agent, for example, a fluorescent reagent that emits light when irradiated with light of a specific wavelength in ultraviolet rays, infrared rays, or visible light by reacting with a secretion secreted from the finger and adhering to the surface of the finger is used.

As described above, the irradiation device 32 is a device that irradiates, with light, the part of the handrail member 16 to be captured by the fingerprint capturing device 33. The light emitted from the irradiation device 32 is light having a wavelength that causes the luminescent agent to emit light, the luminescent agent adhering to the handrail member 16 by the adhesion device 31 and reacting to the fingerprint mark by the secretion from the finger.

By the luminescent agent by the adhesion device 31 as described above and the light irradiation by the irradiation device 32, a clear fingerprint image by the fingerprint capturing device 33 can be obtained as compared with a case where the surface of the handrail member 16 is captured simply with visible light.

The removal device 34 is a device that removes the luminescent agent adhering to and the fingerprint mark left on the surface of the handrail member 16 in a circulation path part behind the circulation path part of the handrail member 16 to be captured by the fingerprint capturing device 33. For example, the removal device 34 includes a configuration in which a cloth containing detergent is pressed against the surface of the moving handrail member 16 to wipe off the luminescent agent and the fingerprint mark with the cloth. The part of the handrail member 16 from which the luminescent agent and the fingerprint mark are removed by the removal device 34 faces the outward part from the entrance toward the exit. This eliminates a fingerprint mark of a person who has gotten off the escalator 14 from being overlapped with a fingerprint mark of another person who subsequently gets on the escalator 14, and suppresses a situation in which the fingerprint cannot be determined due to the overlapping of the fingerprint mark.

In the first example embodiment, the adhesion device 31, the irradiation device 32, the fingerprint capturing device 33, and the removal device 34 constituting the fingerprint acquiring device 3 described above are accommodated in a same housing 35. This configuration makes it possible to bring an effect of improving the work efficiency of construction for installing the fingerprint acquiring device 3 as compared with the case where the adhesion device 31, the irradiation device 32, the fingerprint capturing device 33, and the removal device 34 are separate and independent.

The database 5 is a storage device, and stores a fingerprint image in association with information (hereinafter, also referred to as personal identification information) for identifying a person having the fingerprint. In the first example embodiment, the database 5 stores images of fingerprints of a plurality of persons including a search target person in advance. The database 5 storing such a fingerprint image that is personal information is held by, for example, the police.

The search information providing device 4 includes, for example, a computer device (server), and includes a function of generating and outputting information effective for searching for a search target person using a captured image of a fingerprint upon receiving the captured image from the fingerprint acquiring device 3. That is, the search information providing device 4 includes an arithmetic device 10 and a storage device 11. The storage device 11 is a recording medium that stores data and a computer program (hereinafter, also referred to as program) 12. There are various types of recording media, and the storage device 11 may include any recording medium. The search information providing device 4 may include a plurality of types of recording media, and in this case, the plurality of types of recording media are collectively indicated as the storage device 11. Description of the configuration and operation of the storage device 11 will be omitted.

The arithmetic device 10 includes, for example, a processor such as a central processing unit (CPU) or a graphics processing unit (GPU). The processor can have various functions based on a program by reading and executing the program stored in the storage device 11. For example, in the first example embodiment, the arithmetic device 10 includes functional units of a collation unit 20 and an output unit 21.

The collation unit 20 includes a function of determining, using, for example, a fingerprint pattern for fingerprint detection given in advance, whether a fingerprint has been captured in a captured image received from the fingerprint capturing device 33 of the fingerprint acquiring device 3. Here, the collation unit 20 does not determine the presence or absence of the fingerprint for all the frame images constituting the captured image received from the fingerprint capturing device 33, but determines the presence or absence of the fingerprint for each predetermined number of processing target frame images in a case where the frame images are arranged in time series. For example, in a case where the handrail members 16 captured in the processing target frame images selected for determining the presence or absence of the fingerprint are arranged in the capturing order, the processing target frame images are selected such that the parts captured in an overlapping manner have sizes within an allowable range. That is, when the frame images are arranged in time series, the interval between (number of) the frame images selected as the processing target is determined as described above based on the moving speed of the handrail member 16 and the capturing range of the fingerprint capturing device 33.

The collation unit 20 includes a function of extracting an image part in which the fingerprint is captured from the captured image in a case where the fingerprint is captured in the captured image (processing target frame image). The extracted image part is associated with the same information (time information indicating captured time and information indicating place of capturing) as information associated with the captured image.

When a plurality of fingerprints are captured in the captured image, the collation unit 20 extracts a plurality of image parts in which the fingerprints are each captured from the captured image. The plurality of extracted image parts are associated with the same information (time information indicating captured time and information indicating place of capturing) associated with the captured image (frame image) of the extraction source. The image part extracted by the collation unit 20 is stored in, for example, the database 5 or a database (not illustrated) other than the database 5 in a state of being associated with the time information indicating the captured time and the information indicating the place of capturing.

Furthermore, the collation unit 20 includes a function of collating the extracted image part (hereinafter, also referred to as received fingerprint image) with a fingerprint image (hereinafter, also referred to as stored fingerprint image) stored in the database 5 and determining whether there is a stored fingerprint image that matches the received fingerprint image. In the first example embodiment, the collation unit 20 does not collate all the stored fingerprint images stored in the database 5 with the received fingerprint image, but collates a stored fingerprint image associated with the personal identification information of the person designated in advance as a search target person with the received fingerprint image. The information on the person designated in advance as a search target person is input and held in the search information providing device 4 by, for example, the user operating an input device (not illustrated) for inputting information. Methods for determining whether there is a matching image by collating images include various methods including a method used in the field of fingerprint authentication, and here, the method is not limited and description of the method is omitted. As described above, since the collation unit 20 uses the information (that is, personal information that cannot be provided to the outside) in the database 5, the search information providing device 4 is held and managed by the police similarly to the database 5.

The output unit 21 includes a function of outputting detection information of a search target person to a reporting destination device 7 when the collation unit 20 determines that there is a stored fingerprint image of the search target person matching the received fingerprint image (in other words, the received fingerprint image matches the stored fingerprint image of the search subject). The detection information on the search target person is information indicating that the search target person has been detected, and in the first example embodiment, the detection information includes time information indicating captured time at which the received fingerprint image is captured and information indicating the place of capturing. The detection information of the search target person also includes personal identification information (that is, the personal identification information for identifying the search target person) associated with the stored fingerprint image matching the received fingerprint image. Such detection information on the search target person is output to the reporting destination device 7 and stored in the storage device 11.

The reporting destination device 7 that is a reporting destination to which the output unit 21 outputs the detection information on the search target person is determined in advance. Specific examples of the reporting destination device 7 include, for example, a computer device held and used by the police. Upon receiving the detection information on the search target person, the reporting destination device 7 notifies, visually by a display device and aurally by a speaker, a surveillant monitoring the inside of the facility that the search target person has been detected. The reporting destination device 7 is given, in advance, personal information (information for identifying an individual) such as the name of a search target person associated with the personal identification information of the search target person. When receiving the detection information of a search target person, the reporting destination device 7 may not only notify that the search target person has been detected but also notify the name and the like of the detected search target person. That is, the reporting destination device 7 notifies (provides), for example, the police of (with) effective information for searching for the search target person.

It is assumed that a plurality of the escalators 14 are installed at different places in a same facility. In such a case, the fingerprint acquiring device 3 corresponding to each of the escalators 14 may be installed, and may be further provided the search information providing device 4 connected to each of those fingerprint acquiring devices 3 or commonly connected to those fingerprint acquiring devices 3. Furthermore, it is assumed that the search target person uses the plurality of escalators 14 in the facility in between entry and exit of the facility. In such a case, a plurality of pieces of detection information on the search target person due to the use of the plurality of escalators 14 by the search target person are transmitted to the reporting destination device 7. This enables the reporting destination device 7 to follow the track of the search target person between entry and exit of the facility using those plurality of pieces of detection information on the search target person. The fact that the search target person has entered the facility and the fact that the search target person has exited the facility can be detected using, for example, a face image of the search target person given in advance and a captured image of a face image of a person entering or exiting the entrance of the facility.

Furthermore, the reporting destination device 7 may be connected to the search information providing device 4 connected to each of or in common to the plurality of fingerprint acquiring devices 3 installed corresponding to the respective plurality of escalators 14 provided in town, a building, a station, or the like. In this case, by using the plurality of pieces of detection information on the search target person transmitted from the search information providing device 4, the reporting destination device 7 can follow the track of the search target person in a wider range without being limited to the inside of the facility. The installation places of the search information providing device 4, the database 5, and the reporting destination device 7 are not limited to the police facility, and may be, for example, a police branch room provided in a facility where the escalator 14 is installed.

Figure 2:
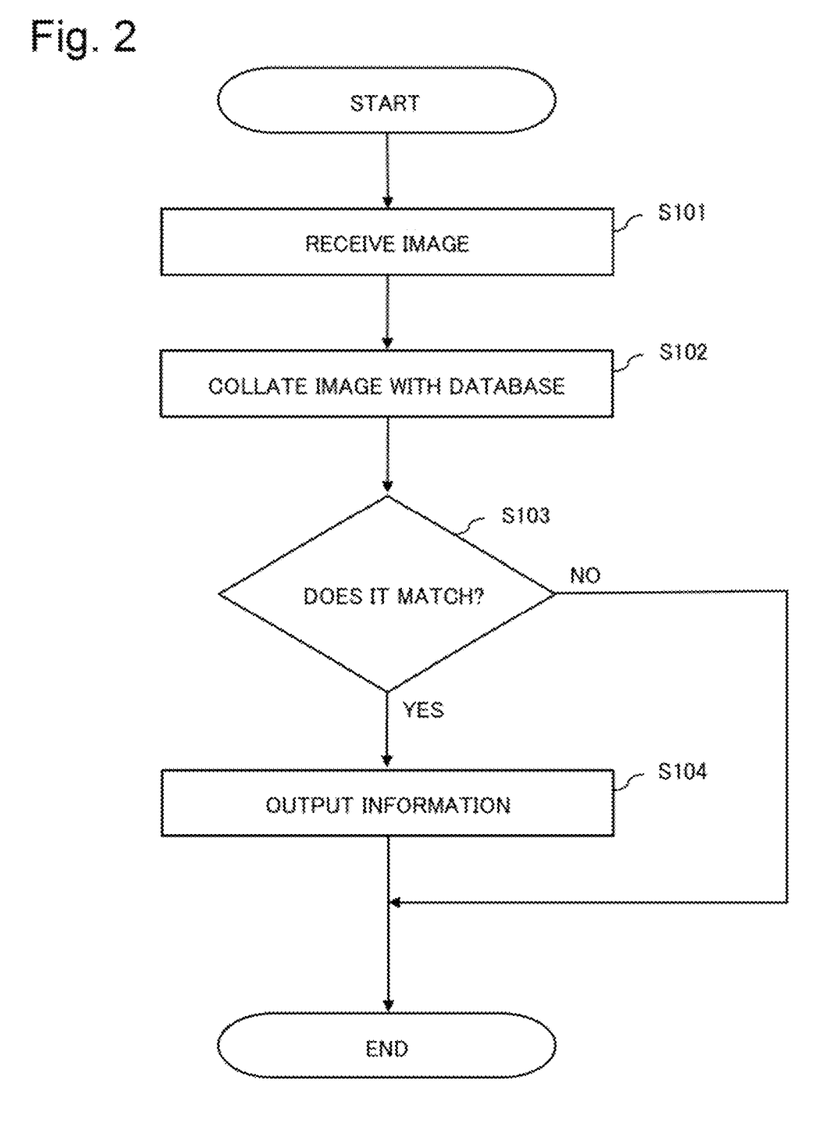
FIG. 2 is a flowchart illustrating an operation example of the search information providing device of the first example embodiment.

Hereinafter, an example of the operation related to information provision in the search information providing device 4 in the first example embodiment will be described with reference to FIG. 2. FIG. 2 is a flowchart illustrating an example of the operation (search information providing method) executed by the arithmetic device 10 of the search information providing device 4.

For example, the search information providing device 4 receives a captured image from the fingerprint capturing device 33 of the fingerprint acquiring device 3 (step S101), and the collation unit 20 of the arithmetic device 10 determines whether a fingerprint is captured in a processing target frame image in the received captured image. In this determination processing, for example, a pattern matching method using a fingerprint image pattern is used.

In a case where a fingerprint is captured in the processing target frame image, the collation unit 20 extracts the image part of the fingerprint as a received fingerprint image, and collates the received fingerprint image with a stored fingerprint image of the search target person in the database 5 (step S102). Then, the collation unit 20 determines whether the received fingerprint image matches the stored fingerprint image having been collated (step S103). In a case where the collation unit 20 determines that the received fingerprint image matches the stored fingerprint image having been collated, the output unit 21 outputs detection information indicating that the search target person has been detected to the reporting destination device 7 (step S104). The detection information includes personal identification information of the search target person associated with the stored fingerprint image matching the received fingerprint image, time information indicating a captured time at which the received fingerprint image is captured, and information on the place of capturing the received fingerprint image.

On the other hand, those processing are repeatedly executed until the collation processing (step S102) and the determination processing (step S103) regarding all (including one) received fingerprint images extracted from the processing target frame image and all (including one) stored fingerprint images of the search target person end. As a result of these processing, in a case where the collation unit 20 determines that there is no stored fingerprint image matching the received fingerprint image, the operation related to the information provision for the processing target frame image in the arithmetic device 10 ends, and the operation (processing) related to the next processing target frame image is prepared.

The search information providing system 1 and the search information providing device 4 of the first example embodiment are configured as described above, and include configurations capable of providing information regarding a search target person using a fingerprint mark for the handrail member 16 of the escalator 14. That is, the search information providing system 1 and the search information providing device 4 of the first example embodiment can obtain an effect of being capable of presenting information that is different from the image of a surveillance camera and is effective for searching for a person.

In the first example embodiment, since the fingerprint acquiring device 3 is a device separate from the escalator 14, the fingerprint acquiring device 3 can be installed corresponding to the existing escalator 14. That is, the search information providing system 1 of the first example embodiment can be constructed using the existing escalator 14.

Second Example Embodiment

Hereinafter, the second example embodiment according to the present invention will be described. In the description of this second example embodiment, parts having names identical to those of the components constituting the search information providing system and the search information providing device of the first example embodiment are given identical reference signs, and redundant description of the common parts will be omitted.

Figure 3:
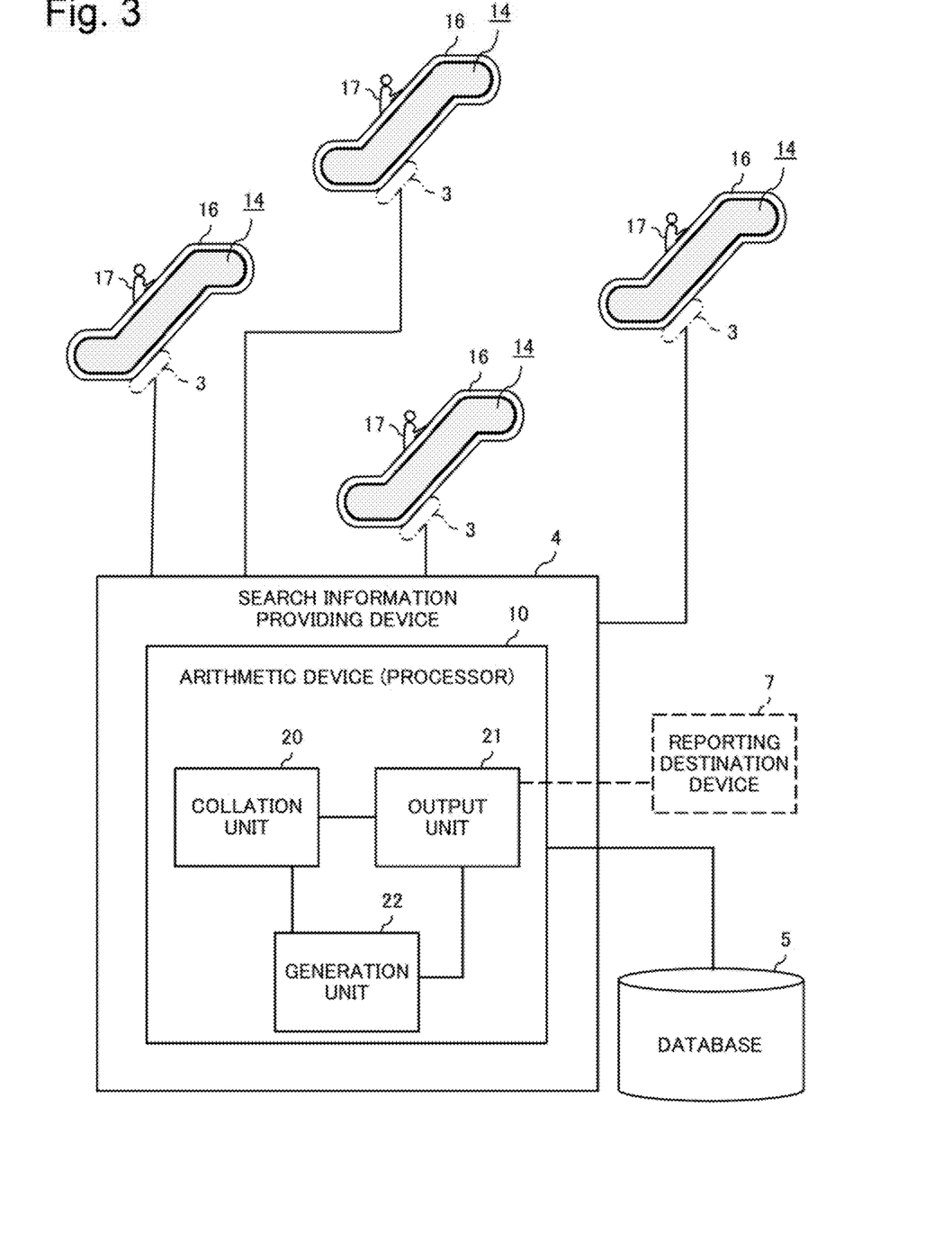
FIG. 3 is a view illustrating a configuration of a search information providing device of a second example embodiment.

The search information providing system 1 and the search information providing device 4 in the second example embodiment have configurations similar to the configurations of the search information providing system 1 and the search information providing device 4 of the first example embodiment. In the second example embodiment, in addition to it, the arithmetic device 10 of the search information providing device 4 includes a generation unit 22, which is a functional unit as illustrated in FIG. 3. In FIG. 3, the storage device 11 in the search information providing device 4 is not illustrated.

In the second example embodiment, the search information providing device 4 is connected to the fingerprint capturing devices 33 of the plurality of fingerprint acquiring devices 3 installed corresponding to the plurality of escalators 14 installed in different places.

The generation unit 22 includes a function of generating track information indicating a track along which the search target person has moved using images of the fingerprint captured by the fingerprint capturing devices 33 of the plurality of fingerprint acquiring devices 3. For example, there is case where the generation unit 22 includes a plurality of pieces of detection information of the same search target person in the detection information on a plurality of search target persons output to the reporting destination device 7 within a predetermined length of time. In such a case, the generation unit 22 generates track information by tracing the track of the search target person by using the time information indicating the captured time of the received fingerprint image and the information indicating the place of capturing that are included in each of the plurality of pieces of detection information of the same search target person.

The track information generated by the generation unit 22 is associated with the personal identification information of the search target person, and the track information is output to the reporting destination device 7 by the output unit 21, for example. The track information associated with the personal identification information of the search target person is stored in the storage device 11 of the search information providing device 4.

Configurations of the search information providing system 1 and the search information providing device 4 in the second example embodiment other than the above-described configurations are similar to those of the first example embodiment.

Since the search information providing system 1 and the search information providing device 4 of the second example embodiment include the similar configurations to those of the first example embodiment, the similar effects to those of the first example embodiment can be obtained. Since the search information providing system 1 and the search information providing device 4 of the second example embodiment can provide the user also with track information of the search target person, they can provide more effective information for searching for the search target person.

Third Example Embodiment

Hereinafter, the third example embodiment according to the present invention will be described. In the description of this third example embodiment, parts having names identical to those of the components constituting the search information providing system and the search information providing device of the first or second example embodiment are given identical reference signs, and redundant description of the common parts will be omitted.

Figure 4:
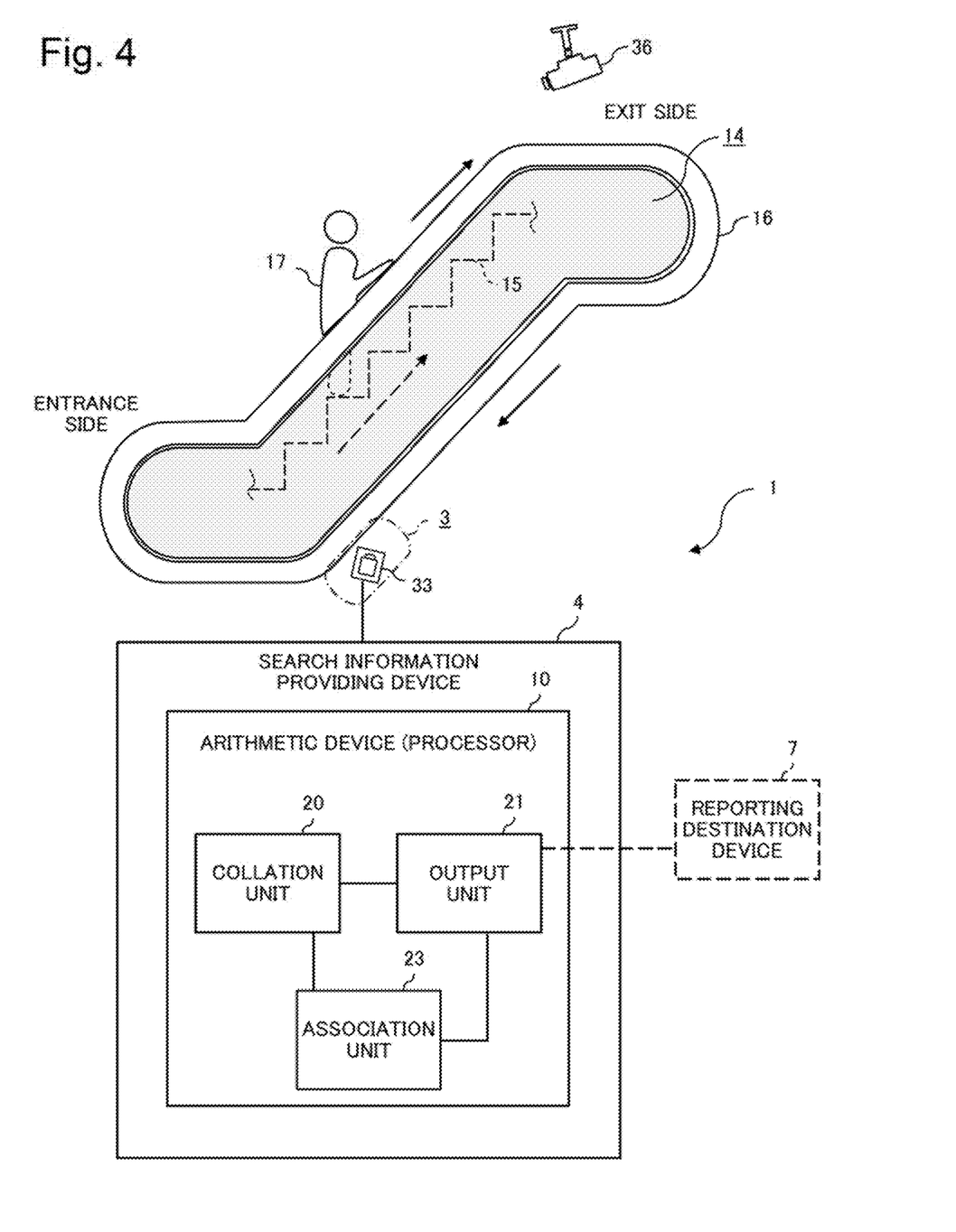
FIG. 4 is a view illustrating a configuration of a search information providing device of a third example embodiment.

The search information providing system 1 and the search information providing device 4 in the third example embodiment include configurations of providing information usable for searching for a search target person by using not only a fingerprint image but also a face image of a person.

That is, the search information providing system 1 and the search information providing device 4 in the third example embodiment include a person capturing device 36 as indicated in FIG. 4 in addition to the configuration of the first or second example embodiment. The person capturing device 36 is, for example, a video camera that captures a moving image, and is installed in such a way as to capture the person 17 on the conveyance member 15. In the third example embodiment, the installation place of the person capturing device 36 is the exit side of the escalator 14. That is, the person capturing device 36 is installed on the exit side of the escalator 14 in consideration of the capturing range of the camera in such a way that the face of a person getting off the escalator 14 and the last step part moving in the ascending direction of the conveyance member 15 are captured in a same captured image.

The person capturing device 36 is connected to the search information providing device 4 and outputs a captured image to the search information providing device 4. The captured image to be output from the person capturing device 36 to the search information providing device 4 is associated with time information indicating the captured time and information indicating the place of capturing.

In the third example embodiment, the arithmetic device 10 of the search information providing device 4 includes an association unit 23 in addition to the functional units described in the first or second example embodiment. The association unit 23 includes a function of associating a received fingerprint image extracted by the collation unit 20 from an image captured by the fingerprint capturing device 33 with a face image captured by the person capturing device 36 of a person assumed to be a person having a fingerprint of the received fingerprint image. That is, the length between the part of the handrail member 16 assumed to be released from gripping by a person who gets off the escalator 14 and the part of the handrail part 16 captured by the fingerprint capturing device 33 is obtained in advance. The moving speed of the handrail member 16 can be acquired based on, for example, information acquired from a rotary drive device (not illustrated) that rotates the handrail member 16. Based on the information on the length and the moving speed and the information on the time at which the processing target received fingerprint image by the fingerprint capturing device 33 is captured, the time at which the person assumed to the person having the fingerprint of the processing target received fingerprint image is captured by the person capturing device 36 can be calculated. Due to this, the association unit 23 calculates the captured time of the captured image by the person capturing device 36 associated with the processing target received fingerprint image, and extracts the captured image captured by the person capturing device 36 at the calculated captured time. Then, the association unit 23 associates the extracted captured image by the person capturing device 36 with the processing target received fingerprint image.

In a case where it is detected from the processing result of the collation unit 20 that there is a stored fingerprint image matching the processing target received fingerprint image, the association unit 23 may associate the captured image by the person capturing device 36 also with the stored fingerprint image of the database 5 matching the processing target received fingerprint image.

When outputting the detection information on the search target person to the reporting destination device 7, the output unit 21 also includes the image captured by the person capturing device 36 associated with the received fingerprint image related to the detection information.

Since the search information providing system 1 and the search information providing device 4 of the third example embodiment include the similar configurations to those of the first or second example embodiment, the similar effects to those of the first or second example embodiment can be obtained. Since the search information providing system 1 and the search information providing device 4 of the third example embodiment can output a face image of a person assumed to be the search target to the reporting destination device 7, they can provide more effective information for searching for the search target person.

In the first to third example embodiments, the search information providing system 1 and the search information providing device 4 that provide information effective for searching for a search target person using a captured image of a fingerprint mark of a person left on the handrail member 16 of the escalator 14 are described. The search information providing system 1 and the search information providing device 4 of the first to third example embodiments can also be applied as a system that provides information effective for searching for a search target person using a captured image of a fingerprint mark of a person left on a handrail member of a moving walkway.

The search information providing system 1 and the search information providing device 4 of the first to third example embodiments can further be applied as a system that provides information when searching for a person scheduled to board in an airport as long as a fingerprint image of the person scheduled to board an airplane can be acquired in advance. In such a case, the database 5 stores a fingerprint image of a person scheduled to board an airplane acquired, for example, by a management company of the airport, a flight company of the passenger airplane, or the like. That is, in such a case, the search information providing device 4, the database 5, and the reporting destination device 7 are not held and managed by the police but are held and managed by the management company of the airport, the flight company of the passenger aircraft, or the like that acquires and holds the fingerprint image. That is, the manager (including an organization such as the management company) who manages the search information providing device 4, the database 5, and the reporting destination device 7 and the installation place are appropriately set according to the purpose of constructing the search information providing system.

It is possible to estimate whether the user of the escalator 14 is an adult or a child, for example, based on information on the size of the fingerprint obtained from the fingerprint image captured by the fingerprint capturing device 33. For this reason, the search information providing device 4 may output a received fingerprint image based on an image captured by the fingerprint capturing device 33 to a predetermined output destination for a purpose other than generation of information used for searching for the search target person.

The search information providing system 1 and the search information providing device 4 in the first to third example embodiments can be applied to an authentication system for entry to an entrance of a room, for example, at the end of a passage leading to the exit side of the escalator 14, for example. However, in this case, it is preferable to bring it together with the configuration for enhancing the security. In such a case, the database 5 stores a fingerprint image of a person permitted to enter a room acquired by a company or the like managing entry and exit of the room, for example. That is, in such a case, the search information providing device 4, the database 5, and the reporting destination device 7 are not held and managed by the police but are held and managed by the company or the like that acquires and holds the fingerprint image.

The search information providing device 4 in the first to third example embodiments may include a function of suspending the operation of the collation unit 20 of the arithmetic device 10 in order to reduce the processing load, for example. For example, in a case where the handrail member 16 captured by the fingerprint capturing device 33 of the fingerprint acquiring device 3 is stopped when there is no user in the escalator 14, the suspension and operation of the collation unit 20 may be controlled according to the stop and operation of the handrail member 16.

The part of the handrail member 16 to be gripped by the hand of a person may be made of a material having a texture that encourages the person to grip, may be designed, or may be colored. Furthermore, the part of the handrail member 16 to be gripped by the hand of a person may be made of a material on which a fingerprint mark is easily left.

Fourth Example Embodiment

Hereinafter, the fourth example embodiment according to the present invention will be described.

Figure 5:
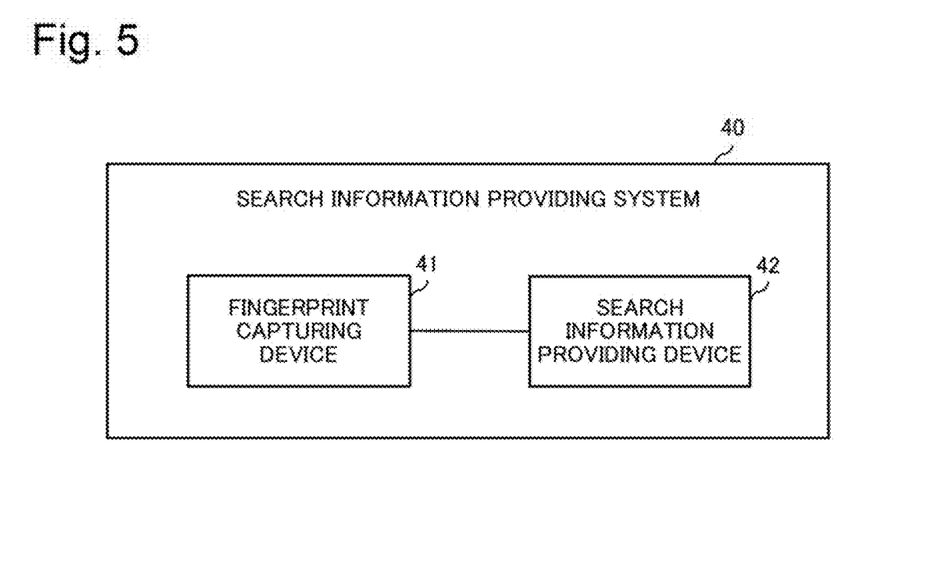
FIG. 5 is a view indicating a configuration of a search information providing system of a fourth example embodiment.

FIG. 5 is a block diagram indicating the configuration of the search information providing system of the fourth example embodiment. A search information providing system 40 includes a fingerprint capturing device 41 and a search information providing device 42.

The fingerprint capturing device 41 is a device that captures an image of a fingerprint of a person left on a handrail member. That is, the handrail member circulates in a circulation path passing through an outward part that assists a person while moving along with movement of a conveyance member that conveys the person by moving from an entrance toward an exit and a return part that moves in a direction from the exit toward the entrance. The fingerprint capturing device 41 captures an image of the fingerprint of the person at the return part in the circulation path of the handrail member.

Figure 6:
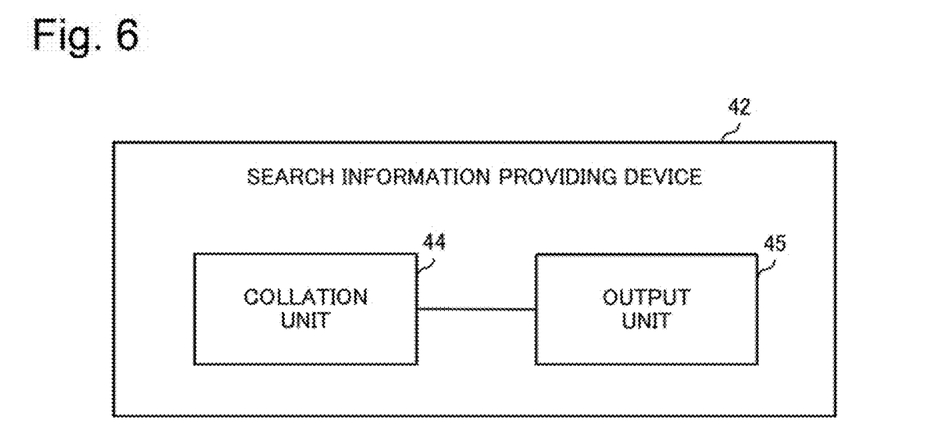
FIG. 6 is a view indicating a configuration of a search information providing device of the fourth example embodiment.

The search information providing device 42 includes a function of generating and outputting information to be used for searching for a search target person using a fingerprint image by the fingerprint capturing device 41. FIG. 6 is a block diagram indicating the configuration of the search information providing device 42. The search information providing device 42 includes, for example, a computer device. The search information providing device 42 includes a collation unit 44 and an output unit 45 as functional units.

The collation unit 44 includes a function of collating a fingerprint image by the fingerprint capturing device 41 with the fingerprint image of the search target person given in advance.

The output unit 45 includes a function of outputting, to a predetermined reporting destination, information indicating that the search target person has been detected, in a case where the fingerprint image on the handrail member matches the fingerprint image of the search target person.

The search information providing system 40 and the search information providing device 42 of the fourth example embodiment are configured as described above. Next, an example of the operation in the search information providing device 42 will be described with reference to FIG. 7.

Figure 7:
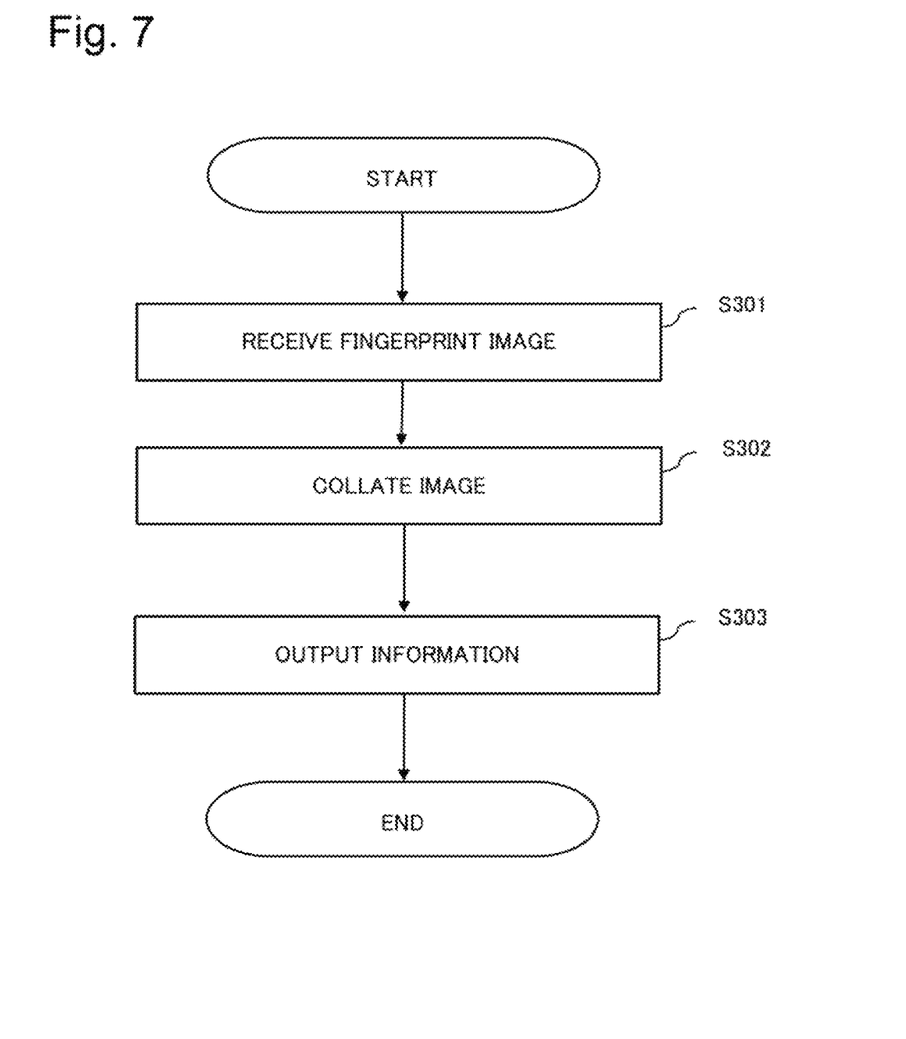
FIG. 7 is a flowchart illustrating an operation example of the search information providing device of the fourth example embodiment.

For example, when the search information providing device 42 receives a fingerprint image from the fingerprint capturing device 41 (step S301), the collation unit 44 collates the received fingerprint image with the fingerprint image of the search target person given in advance (step S302). Thereafter, in a case where the fingerprint image matches the fingerprint image of the search target person, the output unit 45 outputs, to the predetermined reporting destination, information indicating that the search target person has been detected (step S303).

The search information providing system 40 and the search information providing device 42 of the fourth example embodiment, similarly to the first to third example embodiments, include configurations capable of providing information regarding a search target person using a fingerprint mark left to a handrail member. That is, the search information providing system 40 and the search information providing device 42 of the fourth example embodiment can obtain an effect of being capable of presenting information that is different from the image of a surveillance camera and is effective for searching for a person.

The present invention has been described above using the above-described example embodiments as exemplary examples. However, the present invention is not limited to the above-described example embodiments. That is, various aspects that can be understood by those of ordinary skill in the art can be applied in a scope of the present invention.

REFERENCE SIGNS LIST 1, 40 search information providing system
4, 42 search information providing device
16 handrail member
20, 44 collation unit
21, 45 output unit
33, 41 fingerprint capturing device

What is claimed is:

1. A search information providing system comprising:
a search information providing device; and
a fingerprint capturing device,
wherein the search information providing device includes:
  at least one processor configured to:
    collate an image of a fingerprint of a person in a captured image of a fingerprint mark of the person left on a handrail member with an image of a fingerprint of a search target person that is given in advance, the handrail member circulating in a circulation path passing through an outward part and a return part, the outward part being a part of the circulation path to assist the person while moving along with movement of a conveyance member that conveys the person by moving from an entrance toward an exit, the return part being a part of the circulation path to move in a direction from the exit toward the entrance; and
    when the image of the fingerprint of the person on the handrail member matches the image of the fingerprint of the search target person, output, to a predetermined reporting destination, information indicating that the search target person has been detected,
wherein the fingerprint capturing device is configured to capture the fingerprint mark of the person left on the handrail member at the return part of the circulation path and supplies the image of the fingerprint of the person to the search information providing device,
wherein the search information providing system further includes:
  an adhesion device configured to cause a luminescent agent for causing the fingerprint mark of the person in the handrail member to become luminescent to adhere to the handrail member at a part of the circulation path nearer than a part of the circulation path captured by the fingerprint capturing device;
  an irradiation device configured to irradiate a part of the handrail member, the part to be captured by the fingerprint capturing device, with light that causes the luminescent agent to become luminescent; and
  a removal device configured to remove the fingerprint mark of the person and the luminescent agent left on the handrail member, at a part after passing through the part of the circulation path captured by the fingerprint capturing device.

2. The search information providing system according to claim 1, wherein the at least one processor outputs, as information indicating that the search target person has been detected, information for identifying the search target person, time information indicating captured time at which the image of the fingerprint of the person is captured, and information indicating a place of capturing.

3. The search information providing system according to claim 1, wherein the adhesion device, the irradiation device, the fingerprint capturing device, and the removal device are accommodated in a same housing.

4. The search information providing system according to claim 1 further comprising:
   a person capturing device configured to capture a person conveyed by the conveyance member, wherein
   the at least one processor included in the search information providing device is further configured to:
   associate the image of the fingerprint captured by the fingerprint capturing device with an image including the person which is captured by the person capturing device and has a fingerprint captured in the image by the fingerprint capturing device, and
   output, to the reporting destination, the image of the person associated with the image of the fingerprint of the person matching the image of the fingerprint of the search target person, when the image of the fingerprint of the person on the handrail member matches the image of the fingerprint of the search target person.

5. A search information providing method comprising:
   by a computer installed in a search information providing device, collating an image of a fingerprint of a person in a captured image of a fingerprint mark of the person left on a handrail member with an image of a fingerprint of a search target person that is given in advance, the handrail member circulating in a circulation path passing through an outward part and a return part, the outward part being a part of the circulation path to assist the person while moving along with movement of a conveyance member that conveys the person by moving from an entrance toward an exit, the return part being a part of the circulation path to move in a direction from the exit toward the entrance; and
   when the image of the fingerprint of the person on the handrail member matches the image of the fingerprint of the search target person, outputting, to a predetermined reporting destination, information indicating that the search target person has been detected,
   by a fingerprint capturing device, capturing the fingerprint mark of the person left on the handrail member at the return part of the circulation path and supplying the image of the fingerprint of the person to the search information providing device,
   by an adhesion device, causing a luminescent agent for causing the fingerprint mark of the person in the handrail member to become luminescent to adhere to the handrail member at a part of the circulation path nearer than a part of the circulation path captured by the fingerprint capturing device;
   by an irrigation device, irradiating a part of the handrail member, the part to be captured by the fingerprint capturing device, with light that causes the luminescent agent to become luminescent; and
   by a removal device, removing the fingerprint mark of the person and the luminescent agent left on the handrail member, at a part after passing through the part of the circulation path captured by the fingerprint capturing device.

* * * * *